Oct. 11, 1955 R. D. WILEY 2,720,278
FLUID FILTERING DEVICE
Filed Feb. 23, 1954

INVENTOR.
ROBERT D. WILEY
BY
Barnes, Kisselle, Laughlin & Raisch
ATTORNEYS

United States Patent Office 2,720,278
Patented Oct. 11, 1955

2,720,278
FLUID FILTERING DEVICE

Robert D. Wiley, Detroit, Mich., assignor to Master Pneumatic, Inc., Detroit, Mich., a corporation of Michigan Application February 23, 1954, Serial No. 411,716

10 Claims. (Cl. 183—67)

This invention relates to a device for filtering foreign matter out of a fluid. The device is especially adapted for filtering moisture and particulate matter out of the air in a pneumatic system.

An exemplary application of the invention lies in a pneumatic system where air is pumped under pressure from one place to another through pressure lines or pipes. In such a system the air usually carries with it a certain amount of moisture and particulate foreign matter such as dust brought in from the outside atmosphere or scale or corrosion picked up within the system. It is desirable to filter out the moisture to prevent corrosion in the system due to condensation and to filter out the particulate matter to prevent abrasion and clogging of the system and of mechanical devices operated by the compressed air.

An object of this invention is to provide an improved filter of relatively simple and inexpensive construction which is capable of removing nearly all of the moisture and particulate matter carried by air passing therethrough and which at the same time requires a minimum of maintenance and part replacement and causes a minimum line pressure drop.

The invention generally contemplates separating the water vapor and particulate matter from the air by inertia and centrifugal action, utilizing for this purpose a system of baffles in a passageway. A sump is provided for matter thus trapped and a porous filter is provided for catching the small amount of particulate matter not trapped and discharged into the sump. One form of the invention is illustrated in the accompanying drawings:

Fig. 7 is a perspective view of the clip securing the porous filter element in place.

Figure 1:
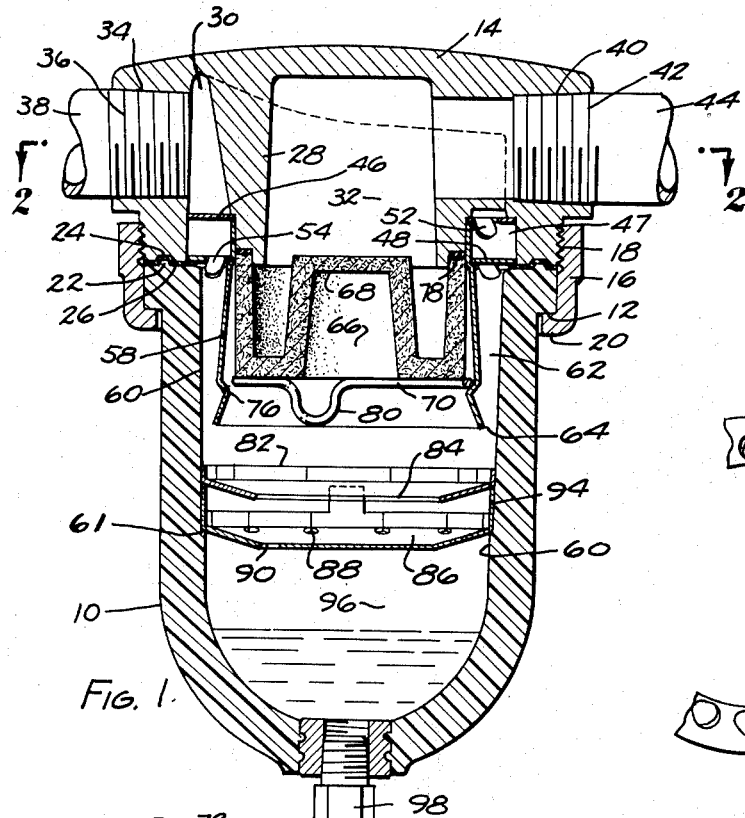
Fig. 1 is a generally sectional view of the device of this invention.
Figure 2:
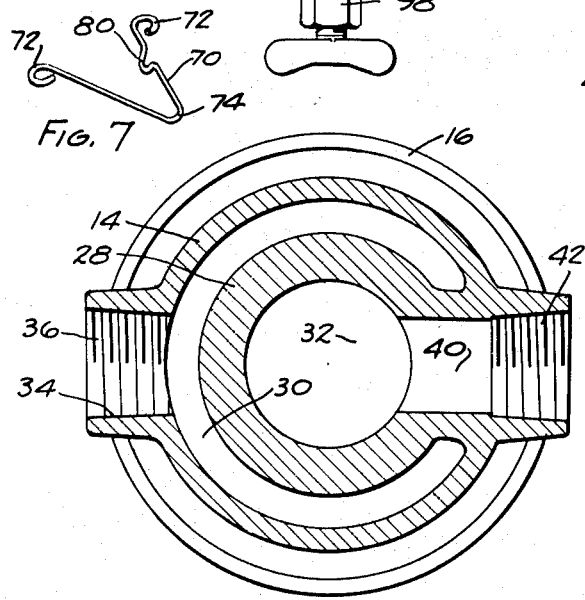
Fig. 2 is a view taken on line 2—2 of Fig. 1.
Figure 3:
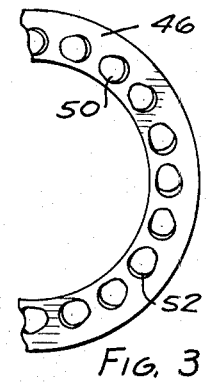
Fig. 3 is a fragmentary view of the upper annular baffle plate in the cap of device.
Figure 4:
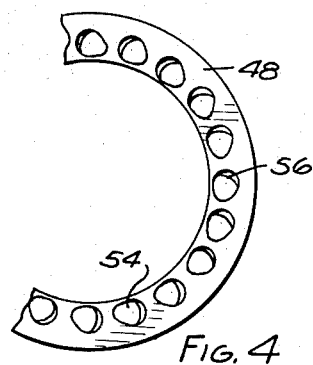
Fig. 4 is a fragmentary view of the lower annular baffle plate in the cap.

The device shown in the drawings has a cup or receptacle 10 with an external peripheral shoulder 12 at its open upper end. A cap 14 is secured over the open end of the cup 10 by such means as a ring 16 threaded to the cap as shown at 18 and having a flange 20 engaging the shoulder 12 on the cup. The upper edge of the cup 10 has an annular bead 22 and the lower edge of the cap 14 has a corresponding annular recess 24, which, together with a gasket 26, provide a hermetic seal between the cup and cap (Fig. 1).

The cap 14 has an interior annular projection 28 which defines two generally concentric annular passageways 30 and 32 which open axially into the cup 10. The cap has an inlet 34 threaded as shown at 36 for connection to a pressure line 38 and communicating into the outer passageway 30. The cap also has an outlet 40 threaded as shown at 42 for connection to a continuation 44 of the pressure line and communicating into the inner passageway 32.

Figure 5:
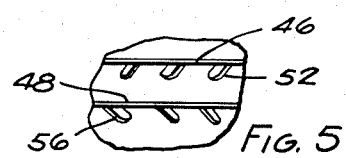
Fig. 5 shows the relative operative positions of the two baffle plates in the cap.

Two annular baffle plates 46 and 48 are disposed within the outer passageway 30 and form a chamber 47. The upstream baffle plate 46 has a circumferential series of openings 50 with a baffle 52 associated with each opening. The downstream baffle plate 48 has a series of openings 54 and baffles 56 similar to those of the upstream plate except that the baffles 56 are angled inversely to the upper baffles 52 (Fig. 5). The baffles 52 and 56 are angled radially outwardly as shown. The openings and baffles may comprise merely struck out portions of the baffle plates.

An annular shroud 58 lies generally in extension of the annular projecting portion 28 of the cap 14, and together with the interior surface 60 of the cup 10 defines a passageway 62 downstream of the baffle plates 46 and 48 and in continuation of the outer passageway 30. The shroud is preferably flared outwardly to gradually restrict the passageway 62 and at its downstream end is a restricted annular orifice 64.

The interior of the shroud defines a passageway 66 lying generally in extension of the inner passageway 32 in the cap 10. A filter 68, which is preferably made of a porous material such as sintered bronze, covers the upstream end of the inner passageway 32. The filter is secured into position by a V-shaped clip 70 whose end portions 72 and apex 74 are supported by a shoulder 76 in the shroud 58. A sealing gasket 78 is interposed between the filter 68 and the cap as shown. The clip is made preferably of Phosphor bronze and an upstanding finger hold portion 80 is formed in one of its legs.

Figure 6:
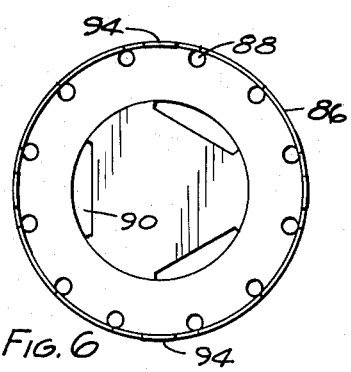
Fig. 6 is a view of the lower baffle disc removed from the receptacle and showing the openings and spacers thereon.

Below the restricted orifice 64 is a baffle disc 82 which is dished and which has a relatively large central opening 84 (Fig. 1). A second baffle disc 86 is positioned below the first and has a number of relatively small apertures 88 arranged circumferentially near its outer edge (Fig. 6). This disc may also have a number of vent openings 90 as shown. The two baffle discs have split flanges which frictionally engage the inner surface of the cup. The cup has an annular shoulder 61 upon which the lower baffle seats and the lower baffle has projections 94 for engaging and locating the upper baffle 82. The two discs are of relatively simple shape and can be formed by stamping. The closed end of the cup below the baffle discs 82 and 86 constitutes a quiescent zone or sump 96 which is provided with a drain cock 98.

In use, air under pressure entering the outer passageway 30 from the pressure line 38 passes through the openings 50 in the upper baffle plate 46 and is given a rotary component as it flows into chamber 47. This component is clockwise as the drawings are viewed. The upper baffle plate 46 serves to break up and distribute masses of moisture or solid particles which may enter the filter, and distribute the same over the lower baffle plate 48. As the air and particles pass through the openings 54 in baffle plate 48, the direction of rotary movement is reversed and the particles of moisture and solids are thrown outwardly against the interior wall of the bowl 10.

Water vapor and particles of solid matter, having specific gravities different from the air, tend by inertia to separate therefrom during this change of direction and the water vapor tends to condense. The radially outwardly angled baffles 56 direct the air in a whirling motion into the passageway 62 and against the interior wall 60 of the cup 10. The resulting centrifugal action tends further to separate the air from the water vapor and particulate matter which it carries, thus creating a second condition for condensation of water vapor. Condensate and solid matter in the passageway 62 are cast by centrifugal force against wall 60 of the cup 10 thereby minimizing the possibility of the shroud 58 being fouled.

The gradual restriction of the passageway 62 causes an increase in the velocity of flow of the air and increases the kinetic energy of particles of condensed moisture and solids. The particles of moisture and solid substance are projected through the orifice 64 and due to their inertia continue downwardly toward the baffle 82. These particles of moisture and substance are whirling or moving in a helical path as they are projected through the orifice 64 and continue in a helical path moving helically along the top surface of the baffle 82 somewhat in a spiral manner.

After passing through the opening 84 the particles of moisture and solid matter again move radially outwardly in a whirling path and are trapped under the baffle 82. In this connection the size of the opening 84 is important. The particles, while still whirling, flow over the upper and outer portions of the baffle 86 and pass through openings 88 in the outer peripheral part of baffle 86 into quiescent zone or sump 96. The zone 96 is vented by passage of air out through the openings 90 which is displaced by that flowing in through apertures 88. The trapped material may be drained from time to time through the drain cock 98. For visual inspection the receptacle 10 may be made of a transparent plastic.

Above the baffle 82 is a low velocity region. Some of the air passing through the orifice 64 turns inwardly and in this low velocity region reverses its direction and flows toward the filter element 68. The air flows through the filter and any particles of moisture or solid material not previously removed is trapped thereby. Dry clean air flows through passage 32 into outlet 40 and into pressure line 44.

Tests have shown that a filter made according to this invention connected to a ½ inch air pressure line 38, having a 1½ inch opening 84 in its upper baffle disc 82 and having its baffle discs spaced apart 11/32 of an inch removes 99% of the moisture from air passing therethrough at the rate of 75 cubic feet per minute and likewise 99% at 105 cubic feet per minute.

A large percentage of the solid matter carried by the air is trapped and discharged into the sump 96 before the air ever reaches the filter element 68. Moreover, the filter element 68 may have an irregular shape as shown, presenting a large filtering area and the outward taper of the shroud 58 provides a space circumjacent the filter element so that its outside wall is also available for filtering. Therefore the filter element can be used over an exceptionally long period before servicing or replacement thereof is necessary.

To disassemble the device for such purposes as servicing or replacement of the filter element 68, the ring 16 is merely unscrewed manually from the cap 14, thereby freeing the receptacle 10. The filter element 68 may be removed from the cap by removing the supporting clip 70; this is done by simply pressing on the finger hold 80 to squeeze the ends 72 of the clip 70 together, thereby disengaging the clip from the shoulder 76 in the shroud 58. The filter element 68 is replaced and the device reassembled by the opposite process. The entire disassembly and reassembly, including filter element replacement, may be accomplished manually in a matter of a few seconds and without the aid of tools.

In addition to being unusually effective and simple of maintenance, there is minimal pressure drop between inlet and outlet of this filtering device.

I claim:

1. A device for filtering fluids comprising, a receptacle open at one end and a cap removably fixed on the open end, means on the cap defining separate generally concentric annular passageways communicating into the receptacle, the cap having an inlet communicating with the outer passageway and an outlet communicating with the inner passageway, first and second annular baffle plates in the outer passageway, said baffle plates being spaced apart and disposed in generally parallel coaxial relation, said first baffle plate having baffles arranged to direct the flow of fluid in one circumferential direction, the second baffle plate having baffles arranged to direct the flow of fluid in the opposite circumferential direction to abruptly change the direction of flow of fluid, whereby matter carried by the fluid tends by inertia to separate therefrom, said baffles being arranged to direct fluid downwardly and around the interior wall of said receptacle whereby matter carried by the fluid tends by centrifugal action to separate therefrom, shroud means on the cap cooperating with the interior wall of the receptacle to form a restricted orifice, baffle means downstream of said orifice positioned to intercept fluid issuing from said orifice and arranged to trap matter separated from the fluid, and a porous filter covering the upstream end of said inner passageway.

2. A device for filtering fluids comprising, a receptacle open at one end and a cap removably fixed on the open end, means on the cap defining separate generally concentric passageways communicating into the receptacle, the cap having an inlet communicating with the outer passageway and an outlet communicating with the inner passageway, first and second baffle means in said outer passageway, said first and second baffle means being disposed in generally parallel coaxial relation, said first baffle means being arranged to direct a flow of fluid in one circumferential direction, said second baffle means being arranged to deflect the fluid in the opposite circumferential direction, said first and second baffle means being spaced axially apart to effect an abrupt change of direction of fluid flow therethrough, whereby matter carried by the fluid tends by inertia to separate therefrom, said baffles being arranged to direct fluid downwardly and around the interior wall of said receptacle whereby matter carried by the fluid tends by centrifugal action to separate therefrom, an annular shroud on the cap and immediately downstream of said second baffle means, said shroud cooperating with the interior wall of the receptacle to form an extension of said outer passageway, the downstream end of the shroud tapering outwardly and cooperating directly with said interior wall to define a restricted annular orifice through which fluid issues at relatively high velocity, baffle means downstream of said orifice positioned to directly intercept fluid issuing from said orifice and arranged to trap matter separated from the fluid, and a porous filter covering the upstream end of said inner passageway.

3. A device for filtering fluids comprising, a receptacle open at one end and a cap removably fixed on the open end, means on the cap defining separate generally concentric passageways communicating into the receptacle, the cap having an inlet communicating with the outer passageway and an outlet communicating with the inner passageway, baffle means in said outer passageway arranged to distribute flow therethrough substantially uniformly and to change the direction of fluid flow therethrough, whereby matter carried by the fluid tends by inertia to separate therefrom, said baffles being arranged to direct fluid downwardly and around the interior wall of said receptacle, whereby matter carried by the fluid tends by centrifugal action to separate therefrom, shroud means on the cap cooperating with the interior wall of the receptacle to form a restricted orifice for increased velocity of flow, baffle means downstream of said orifice creating a quiescent zone in the receptacle, said baffle means including a first baffle disc positioned for directly receiving a flow of fluid from said orifice and a second baffle disc spaced below the first, said baffle discs being generally coaxial and being disposed generally perpendicularly to the direction of flow of fluid through said orifice, the first baffle disc being centrally dished and having a relatively large central aperture whereby to funnel matter separated from the fluid into the space between said baffle discs, the second baffle disc having a generally closed central portion to form said quiescent zone and relatively small peripheral openings whereby to discharge such matter into said quiescent zone, and a porous filter covering the upstream end of said inner passageway.

4. A device for filtering moisture and solid matter out of the air comprising, a body defining a closure, means on the body defining two generally concentric annular zones in the closure, said means terminating at a location intermediate the ends of the closure, said body having an inlet for air under pressure communicating with one zone and an outlet communicating with the other zone, a first circumferential series of baffles in said one zone, a second circumferential series of baffles in said one zone, said first and second series being generally co-axially disposed in generally parallel planes and being spaced axially apart to form a chamber, said first series of baffles being angled to direct fluid into said chamber in one circumferential direction, said second series of baffles being angled to direct fluid leaving said chamber in the opposite circumferential direction, said first and second series of baffles being disposed relatively closely together so that the direction of air passing therethrough is abruptly changed to separate matter therefrom by inertia, an annular shroud in said one zone cooperating with said body to form a restricted annular orifice, a pair of discs downstream of said orifice, said discs being spaced apart and disposed in generally parallel co-axial relation, the upstream disc being positioned to receive directly a flow of fluid from said orifice, said upstream disc being dished and having a relatively large central opening to funnel air into the space between said discs, the downstream disc having a generally closed central region to define a quiescent zone in said closure, said downstream disc having relatively small peripheral openings for discharging matter into said quiescent zone so that matter entering said quiescent zone is retained therein.

5. A device for filtering moisture and solid matter out of air comprising, a body defining a closure, means on said body defining two generally concentric zones in said closure, said means terminating at a location intermediate the ends of said closure, said body having an inlet for air under pressure communicating with the outer zone and an outlet communicaing with the inner zone, a pair of rings in said outer zone, said rings being generally co-axially disposed in generally parallel planes and being spaced axially apart to form a chamber, each ring having a circumferential array of apertures and having baffle elements adjacent said apertures, said baffle elements in the upstream ring being angled to direct fluid into said chamber in one circumferential direction, said baffle elements in the downstream ring being angled to direct air leaving said chamber in the opposite circumferential direction, said rings being disposed relatively closely to each other so that the direction of air flowing through said chamber is abruptly changed for separating matter from the air by inertia, an annular shroud in said outer zone cooperating with said body to form a restricted annular orifice, a pair of discs downstream of said orifice, said discs being spaced apart and disposed in generally parallel coaxial relation, the upstream disc being positioned to receive directly a flow of fluid from said orifice, said upstream disc being dished and having a relatively large central opening to funnel material into the space between said discs, the downstream disc having a generally closed central region to define a quiescent zone in said closure, said downstream disc having relatively small peripheral openings for discharging matter into said quiescent zone so that matter entering said quiescent zone is retained therein.

6. The filter device defined in claim 5 wherein said baffle elements comprise struckout portions of said rings.

7. The filter device defined in claim 5 wherein said downstream disc has relatively small vent openings in its central region.

8. A device for filtering fluids comprising, a receptacle open at one end and a cap removably fixed on the open end, means on the cap defining separate generally concentric passageways communicating into the receptacle, the cap having an inlet communicating with the outer passageway and an outlet communicating with the inner passageway, baffle means in said outer passageway arranged to distribute flow therethrough substantially uniformly and to change the direction of fluid flow therethrough, whereby matter carried by the fluid tends by inertia to separate therefrom, said baffles being arranged to direct fluid downwardly and around the interior wall of said receptacle, whereby matter carried by the fluid tends by centrifugal action to separate therefrom, shroud means on the cap cooperating with the interior wall of the receptacle to form a restricted orifice for increased velocity of flow, baffle means downstream of said orifice creating a quiescent zone in the receptacle, said baffle means including a first baffle disc positioned for directly receiving a flow of fluid from said orifice and a second baffle disc spaced below the first, said baffle discs being generally coaxial and being disposed generally perpendicularly to the direction of flow of fluid through said orifice, the first baffle disc being centrally dished and having a relatively large central aperture whereby to funnel matter separated from the fluid into the space between said baffle discs, the second baffle disc having a generally closed central portion to form said quiescent zone and relatively small peripheral openings whereby to discharge such matter into said quiescent zone, said receptacle having an inwardly tapering portion, said baffle discs being independent of said receptacle and being supported by engagement of one of them with said tapering portion, said baffle discs being independent of each other and being spaced apart by projecting means on one of them.

9. In an air filter of the type having a body defining a closure with concentric inlet and outlet zones, baffles for separating and trapping matter carried by the air passing therethrough, and a porous filter element in the outlet zone, means for securing said porous filter element in position comprising, an annular shroud extending downwardly from said porous filter element and forming a wall defining portions of said inlet and outlet zones, said shroud tapering outwardly at its lower end to form with said body an annular orifice, said shroud having an inwardly formed shoulder on its interior, and a clip supported by said shoulder, said clip having portions supportingly engaging said porous filter element.

10. In an air filter of the type having a body defining a closure with concentric inlet and outlet zones, baffles for separating and trapping matter carried by the air passing therethrough, and a porous filter element in the outlet zone, means for securing said porous filter element in position comprising, an annular shroud extending downwardly from said porous filter element and forming a wall defining portions of said inlet and outlet zones, said shroud tapering outwardly at its lower end to form with said body an annular orifice, said shroud having an inwardly formed shoulder on its interior, and a clip supported by said shoulder, said clip having legs supportingly engaging said filter element and joining in a return bend portion, the end portions of said legs and said return bend portion being supportingly engaged by said shoulder to secure said filter in place, said legs being resiliently disengageable from said shoulder to facilitate removal of said filter element, at least one of said legs having an upstanding finger-hold portion formed therein.

References Cited in the file of this patent

UNITED STATES PATENTS

| 1,854,010 | Woodford | Apr. 12, 1932 |
| 2,010,456 | Jones | Aug. 6, 1935 |
| 2,170,074 | Hewitt | Aug. 22, 1939 |
| 2,467,408 | Semon | Apr. 19, 1949 |
| 2,521,107 | Wiley | Sept. 5, 1950 |
| 2,626,013 | Reimann | Jan. 20, 1953 |

FOREIGN PATENTS

| 293,945 | Germany | Sept. 6, 1916 |
| 1,027,706 | France | Feb. 18, 1953 |